United States Patent [19]

Chabala et al.

[11] Patent Number: 4,690,780

[45] Date of Patent: Sep. 1, 1987

[54] INSULATING MATERIAL AND USE THEREOF IN INSULATORS

[75] Inventors: Leonard V. Chabala, Maywood; John Haarsma, Barrington; Raymond P. O'Leary, Evanston; Christopher D. Roman, Glenview; Thomas J. Tobin, Northbrook, all of Ill.

[73] Assignee: S&C Electric Company, Chicago, Ill.

[21] Appl. No.: 880,867

[22] Filed: Jul. 1, 1986

Related U.S. Application Data

[62] Division of Ser. No. 721,615, Apr. 10, 1985, Pat. No. 4,622,250.

[51] Int. Cl.$^4$ .............................................. H01B 3/20
[52] U.S. Cl. .............................. 252/572; 174/17 LF; 174/17 SF; 174/30; 200/10; 200/150 A; 200/DIG. 4; 585/6.3; 585/6.6
[58] Field of Search ................. 252/572; 585/6.3, 6.6; 174/17 LF, 17 SF, 30; 200/10, 150 A, DIG. 4

[56] References Cited

U.S. PATENT DOCUMENTS

| | | | |
|---|---|---|---|
| 2,036,274 | 4/1936 | Holler | 252/572 |
| 2,781,314 | 2/1957 | Wasson | 252/25 |
| 3,432,431 | 3/1969 | Mitacek | 252/16 |
| 4,011,168 | 3/1977 | Uhlmann | 252/572 |

FOREIGN PATENT DOCUMENTS

| | | | |
|---|---|---|---|
| 3816965 | 9/1963 | Japan | 174/17 LF |
| 59-155497 | 9/1984 | Japan | 252/16 |

*Primary Examiner*—Robert A. Wax
*Attorney, Agent, or Firm*—James V. Lapacek

[57] ABSTRACT

An improved insulating material is provided. The insulating material is a mixture of an insulating fluid and solid insulative bodies. The insulating material exhibits desirable insulating, conformal coating, surface adhesion, and low-viscosity characteristics. For example, when the insulating material is used to fill the cavity of a hollow insulator, the insulating material prevents any moisture that enters the insulator from adhering to the walls that define the cavity; thus maintaining the insulating qualities of the insulator. In the event that some of the fluid is lost through leakage, the insulating material also aids in preserving the insulating qualities of the insulator.

18 Claims, 3 Drawing Figures

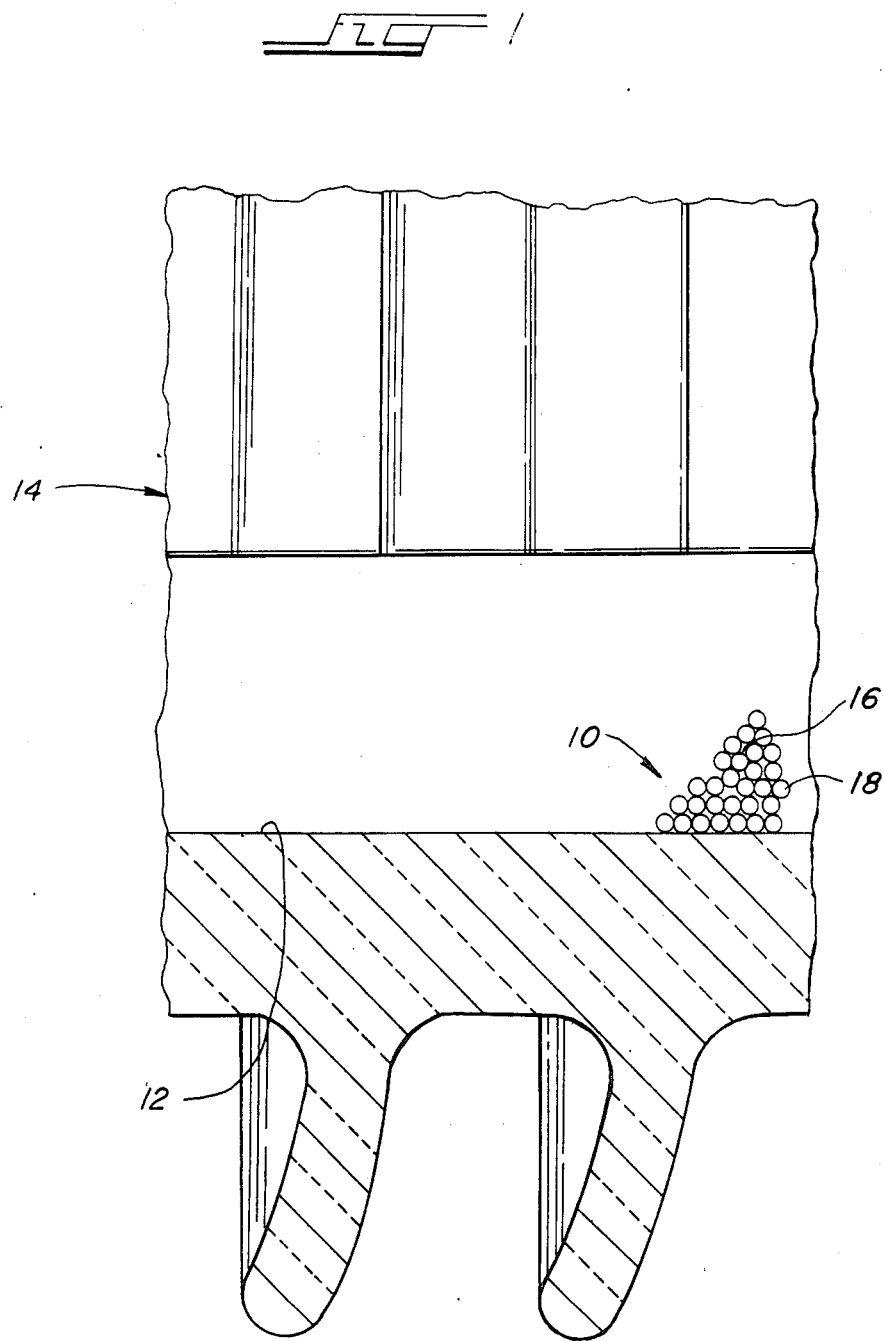

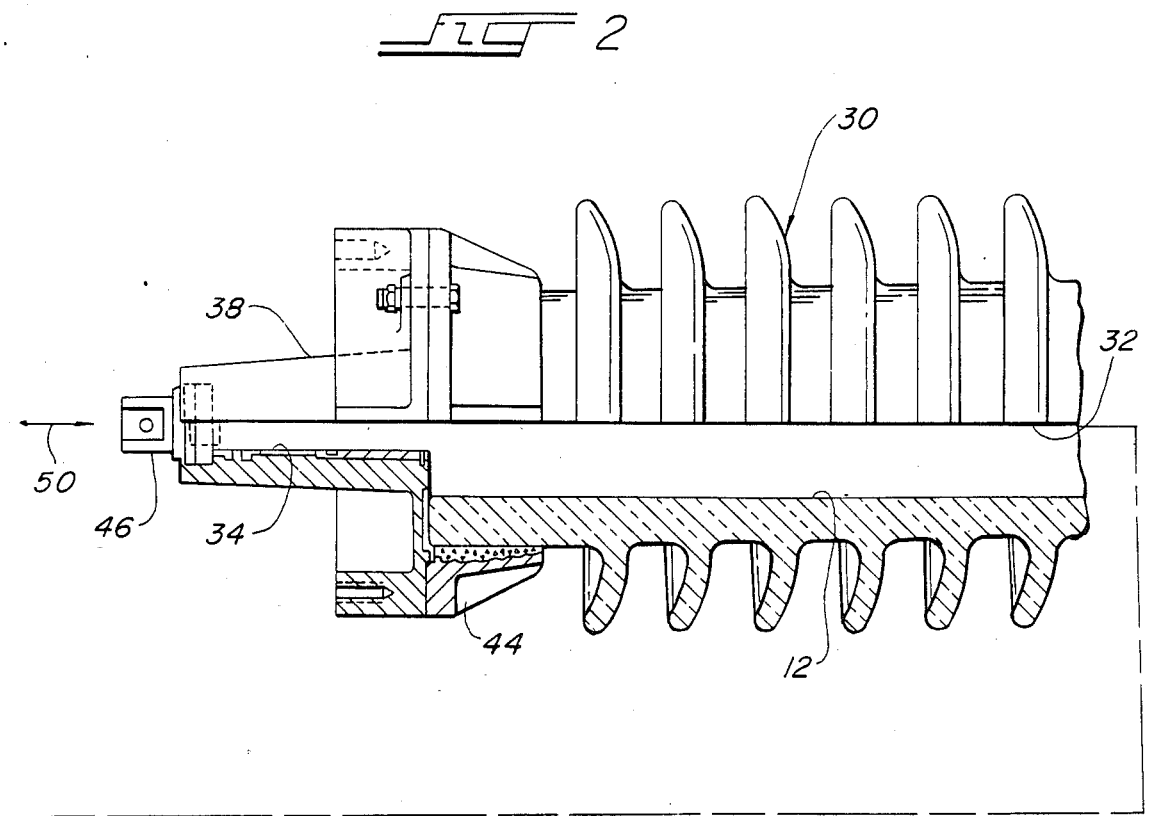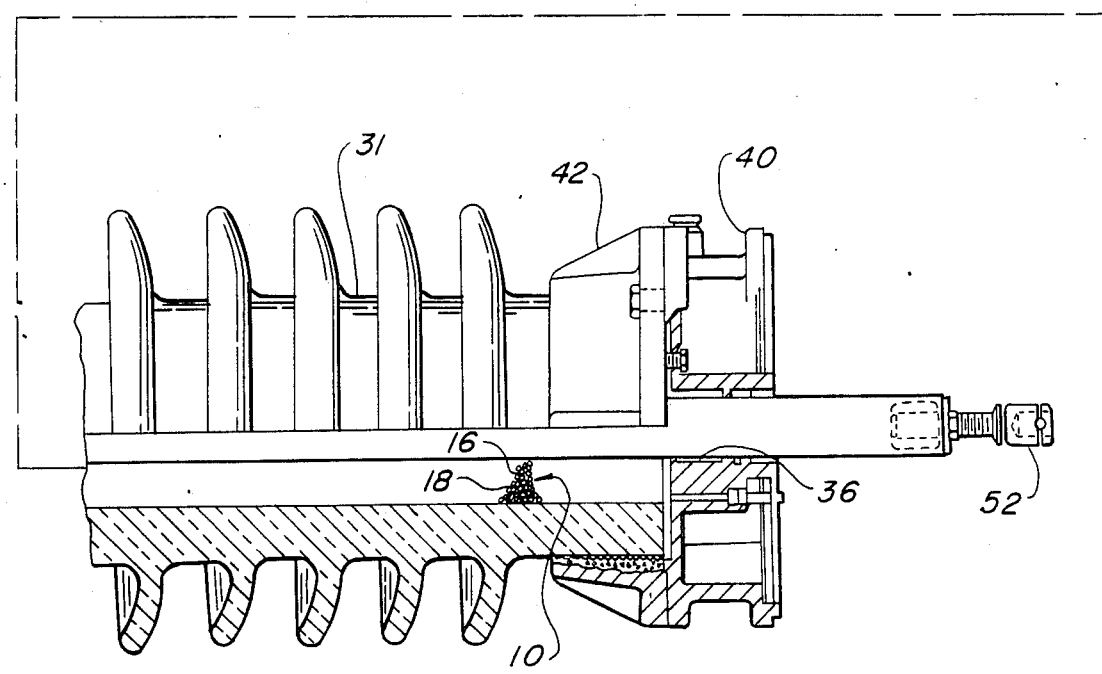

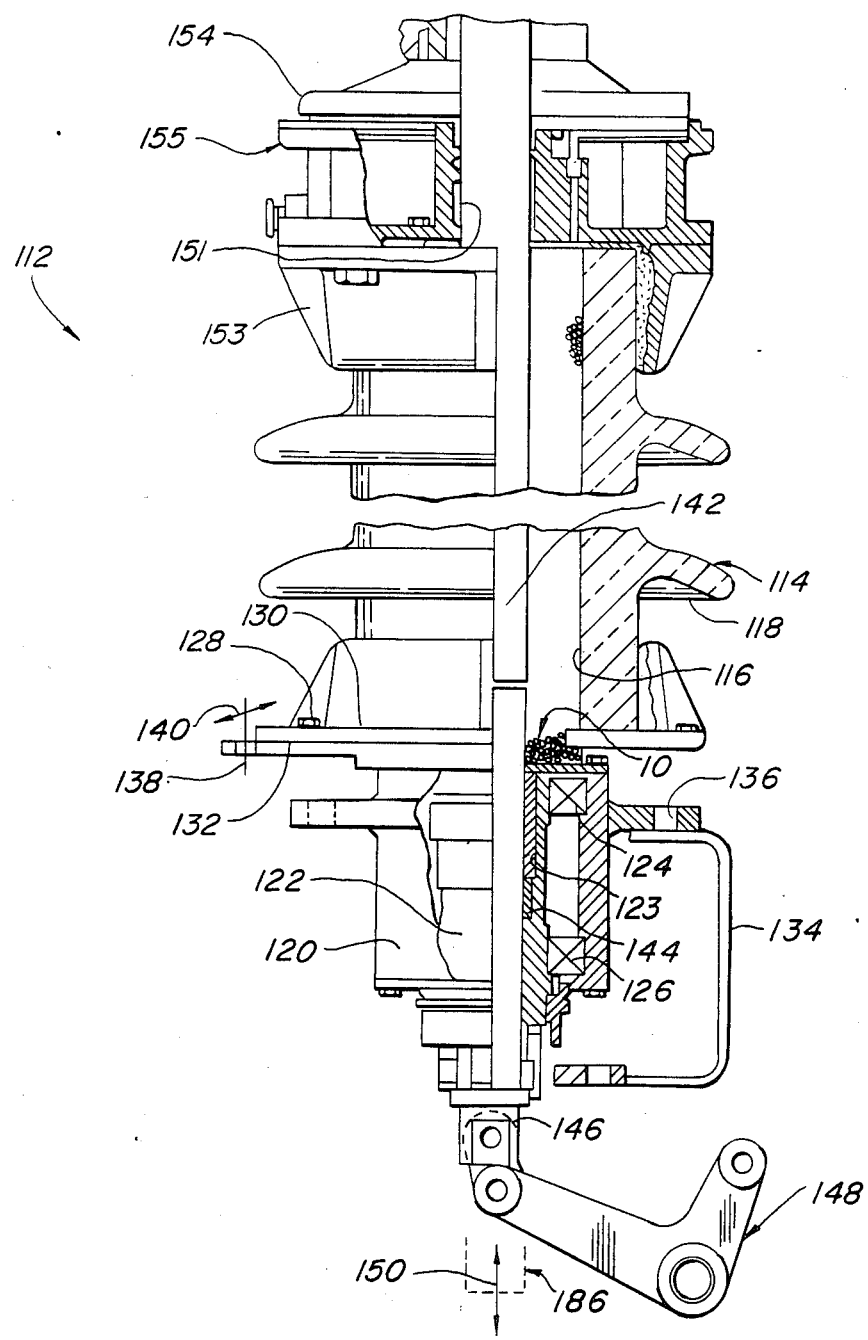

INSULATING MATERIAL AND USE THEREOF IN INSULATORS

This is a division of application Ser. No. 721,615, filed Apr. 10, 1985, now U.S. Pat. No. 4,622,250.

CROSS-REFERENCE TO RELATED APPLICATIONS

This application is directed to an improved insulating material which is used to advantage to provide an improved insulative operating column of the type disclosed and claimed in commonly-assigned, co-pending application Ser. No. 721,616 filed in the names of L. V. Chabala et al on Apr. 10, 1985, now U.S. Pat. No. 4,596,906.

BACKGROUND OF THE INVENTION

1. Field of the Invention

The present invention relates to an improved insulating material; the insulating material being a mixture of an insulating fluid and solid bodies.

2. Description of the Related Art

Various devices utilize gas-filled vessels such as interrupting units at high voltage. It is often required to actuate parts within the vessel by employing a ground-potential mechanism and an insulating actuating member that connects the ground potential mechanism to the parts within the vessel.

The actuating member often passes through a hollow insulating support column that is filled with the same gas as the vessel at top where the gas is able to communicate between the vessel and the support column. This arrangement includes the drawbacks that the support column has a number of joints that must be sealed against gas leakage. This requires special handling during manufacture. Field assembly is also complicated since gas is normally added at the time of installation and contamination must be avoided either as to the pressurized vessel or the support column. Additionally, while in service, the gas pressure must be monitored by special monitoring equipment to ensure that no breach of insulating integrity has occurred in the column and the interrupting unit.

An insulating liquid can be used to overcome the drawbacks with pressurized gas columns. The liquid is easier to seal and contamination is more easily avoided. However, a desirable fluid is relatively expensive and if the fluid is lost through leakage, moisture can enter the column and collect on the internal surfaces thereof; the insulating properties of the column thereby being reduced.

A solid insulation can be utilized but it is difficult to provide movement of actuating members through solid insulation. Further, it is difficult to prevent air pockets that would lead to dielectric breakdown.

Prior arrangement have utilized an insulating fluid and sand where the sand settles to the bottom and packs densely or cakes. Movement of an actuating member through such an arrangement would also prove difficult due to the high viscous drag on the actuating member and the settling and packing of the sand.

While these arrangements are generally suitable for some purposes, it is always desirable to provide improved insulating materials and insulating operator columns that exhibit fewer shortcomings in the areas of sealing problems, maintenance, thermal expansion problems, air pockets and uniformity.

SUMMARY OF THE INVENTION

Accordingly, it is a principal object of the present invention to provide an improved insulating material that avoids one or more drawbacks of the prior art.

It is another object of the present invention to provide an insulating material that is a mixture of an insulating fluid and solid insulative bodies; the insulating material providing desirable surface-coating characteristics while also exhibiting low-viscosity properties.

It is a further object of the present invention to provide an insulating material that includes an insulating fluid and solid bodies while remaining relatively free-flowing and having a desirable fluidity.

It is a further object of the present invention to provide an improved insulating material including an insulating fluid and solid insulative particles for use in a hollow insulating column, the insulating material exhibiting a desirable apparent viscosity to permit the movement of an operating member within the insulating material and preventing the deposition of moisture on the internal surfaces of the insulating column even if some of the insulating fluid is lost through leakage; the insulating material including an appropriate combination of particle geometry and population per unit volume to achieve the desired properties while permitting a desirably low ratio of fluid volume to particle volume.

Briefly, these and other objects and advantages of the present invention are achieved by a mixture of an insulating fluid and solid insulative bodies or pellets to provide an improved insulating material that is relatively free-flowing and of desirable fluidity. The size and geometry of the solid bodies are chosen to avoid caking or conglomerate packing, and to be relatively free of interlocking with each other. Generally spherical bodies possess these desired qualities. However, bodies of other geometries such as elongated or flattened, smoothly contoured bodies may also be suitable for various application. For example, the geometry of the solid bodies can be generally described by an aspect ratio defined by the largest dimension divided by the smallest dimension. In this regard, an aspect ratio of 3 to 1 is generally suitable for many applications while an aspect ratio in the range of 5 to 10 to one may be suitable for some applications provided that the shapes are noninterlocking and the percentage by volume of the solid bodies is appropriate.

The insulating material exhibits desirable insulating, conformal coating, surface adhesion, and low apparent viscosity properties, while also providing desirable properties in the event that some of the fluid is lost through leakage. For example, the use of the insulating material of the present invention to fill the bore of an insulator provides the desirable properties of a fluid to coat the inside surfaces of the insulator and provides moisture-repellant properties. In the event that some of the insulating fluid is lost through leakage, the build-up of moisture on the inside surfaces of the insulator is substantially reduced as compared to the performance of an insulating fluid without the provision of the solid, insulative bodies. Further, the insulating material of the present invention reduces the amount of relatively expensive insulating liquid that would be required to fill the bore. The insulating material of the present invention also reduces the amount of material in the insulator that exhibits undesirable volumetric changes with temperature. Accordingly, this reduces the size of any volume compensator that would be required for an all-liquid filler.

In insulating columns that are required to allow movement of an actuating member within or through the column at relatively high speeds, the insulating material in the column must exhibit an appropriate density and apparent or effective viscosity. The term apparent or effective viscosity refers to the relatively low viscosity encountered by a moving object within the insulating material as will be explained in more detail hereinafter. The apparent viscosity is relatively low as compared to most solids and is substantially unchanged from that of an insulating fluid; e.g. not more than an order of magnitude in a specific application which is a relatively small change for viscosity parameters. The insulating material of the present invention provides these desirable characteristics through the provision of predetermined densities, sizes, shapes and population of the solid insulative bodies. Prior insulating arrangements that employed liquid and sand where the sand settles to the bottom and packs densely would not be acceptable for this application. The high-viscous drag on the actuating member resulting from the settling and packing of the prior insulating arrangements inhibits high-speed movement of an actuating member through a column.

BRIEF DESCRIPTION OF THE DRAWING

The invention, both as to its organization and method of operation, together with further objects and advantages thereof, will best be understood by reference to the specification taken in conjunction with the accompanying drawings in which:

FIG. 1 is a partial elevational view, partly in section, illustrating an application of the insulating material of the present invention within an insulator;

FIG. 2 is an elevational view, partly in section, of an insulating column fabricated and assembled in accordance with the present invention; the insulator column serving a support function and also internally carrying an operating member; and FIG. 3 is an elevational view, partly in section and with parts cut away, of an insulating column fabricated and assembled in accordance with the present invention; the insulating column serving a support function, carrying an internal operating member, and being rotatable to provide an operating drive function.

DETAILED DESCRIPTION

The improved insulating material of the present invention is provided by a mixture of an insulating fluid and solid bodies, particles, or pellets of insulating material. The resulting mixture of the present invention provides desirable insulating, surface adhesion and low apparent or effective viscosity characteristics while providing an advantage over the insulating fluid for certain applications as will be explained in detail hereinafter. Additionally, the low coefficient of thermal expansion of the solid material provides an insulating material having significantly lower net thermal expansion properties than that of the insulating fluid per se. The solid particle density, size, geometry and population density can be suitably varied to provide various characteristics of the insulating material regarding apparent viscosity and the reduced volume of the insulating fluid. The geometry of the solid particles and the population density can be varied while still providing an insulating material that is relatively free-flowing and of desirable fluidity; desirable properties for many applications such as to fill the bore of an insulating support column that includes an operating member that is moved within the column. For example, the insulating material provides low apparent or effective viscosity to the moving operating member and provides coating of the internal surfaces of the insulator support column to act as a moisture-repellant for preventing moisture build-up even if some of the insulating fluid is lost through leakage. The insulating material of the present invention also functions as a lubricated insulating material as to the solid material included in the mixture. Further, considering the geometry of the solid material, while generally spherical bodies are suitable to practice the present invention, various other geometries are also suitable. However, to achieve desirable reductions in the volume of insulating fluid in the insulating material, while maintaining a relatively free-flowing material, the geometry of the solid material should be chosen to avoid caking or conglomerate packing and interlocking.

While the insulating material for purposes of illustrative example is described in detail hereinafter to provide improved insulative columns having operating members movable therein and therethrough, it should be realized that the described features and characteristics are applicable to numerous other applications and varieties of apparatus, including both static and dynamic arrangements, as will be apparent to those skilled in the art.

For example, and referring now to FIG. 1, the insulating material 10 of the present invention is a typical application is provided to fill the longitudinal bore 12 of an insulator 14 fabricated and assemblied in accordance with the present invention. The insulator 14 may be utilized to replace the insulating support member for the electrical switch or interrupting unit such as disclosed in U.S. Pat. No. 3,432,780. The insulator 14 may also be utilized to replace the rotating support column, such as disclosed in U.S. Pat. No. 3,508,178. In any event, the insulating material 10 includes an insulating fluid 16 and solid bodies 18 of insulating material. While the bodies 18 are depicted as generally round in FIG. 1, for purposes of illustration, it should be realized that the shape of the bodies 18 can be various shapes, sizes and densities while still providing the insulating material 10 with the desired properties. For the purposes of a particular application, the insulating material 10 provides coating and adherence to the internal walls of the insulator 14 due to surface tension, surface adhesion and capilliary attraction. Further, should a leak occur in the insulator 14 such that some of the insulating fluid 16 is lost, the insulating properties of the insulator 14 will decrease gradually as opposed to the more rapid decrease if the insulator were filled solely with an insulating fluid; the decline in insulating properties being caused by moisture entering the insulator and depositing on the walls. The insulating material 10 of the present invention inhibits moisture build-up since the solid bodies 18 provide a large surface area that retains the insulating fluid. Accordingly, the insulating material 10 aids in preventing moisture from coating the walls of the insulator 14 which may be drawn into the insulator 14 by pressure variations; desirably, the solid bodies 18 being an appreciable proportion by volume of the insulating material 10 to aid in retaining the insulating fluid 16 of the insulating material 10.

Referring now to FIG. 2, the use of the insulating material 10 is advantageous in the fabrication and assembly of the insulating support column 30 of the present invention. The insulating support column 30 includes a longitudinal bore 12 formed through an insulator body 31 within which is disposed an elongated operating member 32. The elongated operating member 32 is mounted for sliding or rotation in insulating support column 30 by means of suitable bearings 34 and 36. The lower bearing 34 is mounted in a lower seal housing 38 through which the operating member 32 passes. An upper seal housing 40 carries the bearing 36. The upper seal housing 40 is affixed to a mounting flange 42 which in turn is fastened to the insulator body 31. Similarly, the lower seal housing 38 is affixed to a mounting flange 44 which in turn is fastened to the insulator body 31.

The insulating support column 30 is attached to a support beam or base via the lower seal housing 38. In one specific arrangement, the operating member 32 is driven at a lower end fitting 46 over a linear path referred to at 50. The linear movement of the operating member 32 is coupled via an upper end-connector 52 through suitable linkage to operate the specific apparatus attached thereto; e.g., an interrupter unit.

In accordance with the operation of the insulating support column 30 with the operating member 32, the insulating material 10 provides all the desirable characteristics as were utilized for use with the insulator 14. Additionally, the insulating material 10 functions in the insulating support insulator 30 to provide reduced seal requirements and leakage considerations than would be the case if an insulating fluid alone were utilized. Since the insulating material 10 exhibits relatively low apparent or effective viscosity characteristics, the operating member 32 in specific applications is capable of rapid operation without detrimental viscous drag.

Considering other applications of the insulating material 10 and referring now to FIG. 3, the insulating material 10 is used to fill the bore 116 of the insulator 114 of the operating column 112, which may also be referred to as a rotatable support column. The insulative operating column 112 is arranged to be rotated and includes an operating member 142 longitudinally disposed therethrough to provide independent rotary and linear drive arrangements.

The insulating operating column 112 is mounted for rotation with respect to a base housing 120 by bearings 124,126 cooperating with a base member 122 of the insulating operating column 112. The base member 122 is fixedly fastened to the insulator 114 by means of suitable fasteners referred to generally at 128. The fasteners 128 sealingly interconnect a mounting flange 130 of the insulator 114 and the base member 122. In the specific illustration, the housing 120 is carried by a base beam 134 and rigidly attached thereto by fasteners 136. The insulating support column 112 is rotated by a drive linkage referred to at 138 via interconnection to a drive arm 132 of the base member 122. Accordingly, operation of the drive linkage 138 represents a rotary drive input as illustrated by the bidirectional arrows at 140.

The elongated operating member 142 is disposed for rotation and reciprocation with respect to the base member 122 via bearing 144. The lower end of the elongated operating member 142 extends through the base member 122 and fixedly carries an end fitting 146. As illustrated in FIG. 3, the end fitting 146 is pivotally connected to a bell crank 148. Accordingly, clockwise and counterclockwise pivoting of the bell crank 148 causes linear movement of the operating member 142 in the directions illustrated at 150; the movement of the bell crank 148 representing a linear drive input.

The operating member 142 at the upper end thereof, as shown in FIG. 3, passes through the insulator 114 and a base flange 154 fastened to an upper seal housing 155. The upper seal housing 155 is fixedly attached and sealingly connected to an upper insulator mounting flange 153. In turn, the upper mounting flange 153 is affixed to the upper portion of the insulator 114. The operating member 142 passes through the apertured mounting flange 153. The seal housing 155 includes a bearing 151 for the operating member 142. In a specific arrangement, the operating member 142 is fabricated from glass-epoxy tubing or rob. For a more detailed discussion of the insulative operating column 112, reference may be made to co-pending, commonly assigned U.S. Application Ser. No. 721,616 filed in the names of L. V. Chabala et al on Apr. 10, 1985, now U.S. Pat. No. 4,596,906.

In accordance with important aspects of the present invention, the insulating material 10 provides features in the insulative operating column 112 additional to those provided for the support insulator 14 of FIG. 1 and the support insulator 30 of FIG. 2. Specifically, the insulating material 10 efficiently allows for rotation of the insulative operating column 112 and rapid translational movement of the operating member 142. It should be understood that in another specific arrangement, the operating member 142 is rotated instead of translated. Further, in yet other specific arrangements, the operating member may be arranged for total internal operation within an enclosure.

Considering one specific illustrative example of the composition of the insulating material 10 for the insulative operating column 112, it has been found suitable to utilize Dow Corning Silicone Fluid available under the designation DC 561 or other suitable liquid having similar dielectric properties and viscosity within the range of 10 to 500 centistokes for the insulating fluid 16. It has also been found suitable to utilize, for the solid bodies 18, generally rounded polyethylene pellets or other suitable material approximately one-eighth of an inch in overall size with the quantity of fluid 16 being sufficient to completely submerge the pellets 18. The size, density and volume of the solid bodies 18 is chosen to decrease the volume of the liquid while not unduly raising the viscous drag effect on the operating member 142 when the member 142 is rapidly moved. A lower quantity of fluid also results in a cost savings as well as the other advantages discussed herein. The proportion of the solid bodies 18 by volume is approximately 60–70% with the densities or specific gravities of the pellets 18 and the dielectric fluid 16 being approximately equal to each other. For this specific example, the insulating material 10 exhibits an effective or apparent viscosity of approximately 500 centistokes if a fluid 16 having a viscosity of 50 centistokes is utilized. Accordingly, the increase of an order of magnitude of the viscosity represents a relatively small, substantially unchanged viscosity as compared to solids and to the relatively large variations of viscosity parameters with respect to temperature. With approximately equal densities, the bodies 18 neither float above the liquid 16 nor pack tightly at the bottom. The acceptably low coefficient of net thermal expansion of the insulating 10 material permits higher initial fill levels during manufacture. Accordingly, the insulating material 10 functions as a lubricated insulating material.

This mixture has been found to conformally coat the operating member 142 and the interior walls of the insulator 114, which in a specific embodiment is fabricated from procelain. The use of the silicone fluid is preferred over petroleum-based liquid or transformer oil because the silicone liquid is less flammable, is odorless and has no toxic effects. The size of bodies 18 is chosen so that an individual body is not a significant factor of the dimension from the bore 116 to the operating member 142 in the insulator 114. While plastics and and other materials are suitable for the solid bodies 18, the material should not introduce abrasive powders that could damage any seals or operating members. Further, with this mixture, even should the lower housing be opened or develop a leak, which might ordinarily permit a nearly total loss of an all-fluid filler, an effective and therefore significant quantity of fluid 16 remains bound to the solid bodies 18, to the inner walls of the porcelain forming the bore 116, and to the operating member 142. Accordingly, the surfaces are sufficiently coated through capillary attraction, surface tension, and surface adhesion to maintain appropriate insulating characteristics to prevent electrical leakage paths within the insulator 112 and to prevent deposition of moisture. Further, the seals on the operating member 142 are required to withstand only the gravity head of the fluid 16 within the insulator 114. An aerator in the upper seal housing 155 vents the interior of the insulator 112 to the ambient for pressure equalization without the inspiration of moisture. Such an aerator is disclosed in U.S. Pat. No. 3,696,729 issued to L. V. Chabala et al on Oct. 10, 1972 which is hereby incorporated by reference.

While the solid bodies 18 have been discussed as being of generally uniform size, in other specific embodiments, the solid bodies 18 include bodies of two or more different sizes such that the interstices between the larger bodies will be generally filled by the smaller bodies; thus providing a further reduction in the volume of the insulating fluid 16 if this should be desired. Further, the solid bodies 18 in other specific embodiments are non-rigid bodies of elastomeric material.

While there has been illustrated and described various embodiments of the present invention, it will be apparent that various changes and modifications will occur to those skilled in the art. For example, while a specific illustrative example utilized a fluid 16 having a viscosity of 50 centistokes to provide an insulating material having a viscosity of 500 centistokes, it should also be realized that the present invention may be practiced using a fluid 16 of various viscosity parameters; a fluid 16 having a lower viscosity value will provide an insulating material 10 exhibiting lower viscosity values. Further, while approximately equal densities are discussed, it should be understood that relative densities for the insulating fluid 16 and the solid bodies 18 within the range of 0.7 to 1.0 of each other may also provide suitable results for particular applications. Additionally, the size of the solid bodies can also be widely varied for various applications; e.g. from 0.01 to 0.5 inch. As discussed hereinbefore, the shape or geometry of the solid bodies 18 may also be widely varied. It is intended in the appended claims to cover all such changes and modifications as fall within the true spirit and scope of the present invention.

What is claimed and desired to be secured by Letter Patent of the United States is:

1. An insulating material consisting of 10% to 80% by volume of an insulating fluid and 20% to 90% by volume of solid insulative bodies, the relative volumes and densities of said insulating fluid and said solid bodies, and the shape of said solid bodies being determined to provide a relatively free-flowing mixture, the densities of said insulating fluid and said solid insulative bodies being generally equal, the apparent viscosity of the insulating material to an object moving therein being less than 20 times the viscosity of said insulating fluid.

2. The insulating material of claim 1 wherein the relative densities of said insulating fluid and said solid insulative bodies are in the range of 0.7 to 1.0 of each other.

3. The insulating material of claim 1 wherein said solid insulative bodies are generally rounded and have a maximum cross section within the range of 0.01 to 0.5 inch.

4. The insulating material of claim 3 wherein the maximum viscosity of said insulating fluid is 10,000 centistokes.

5. The insulating material of claim 1 wherein said solid insulative bodies comprise a plurality of different sizes.

6. An insulating material consisting of 10% to 80% by volume of an insulating fluid and 20% to 90% by volume of solid insulative bodies, the density of each of said insulating fluid and said solid insulative bodies being generally equal.

7. The insulating material of claim 6 wherein said densities are within the range of 0.7 to 1.0 of each other.

8. The insulating material of claim 6 wherein said densities are in the range of 0.5 to 2.0 gram per cubic centimeter.

9. The insulating material of claim 6 wherein said solid insulative bodies are generally rounded.

10. The insulating material of claim 6 wherein the maximum cross section of said solid insulative bodies is 0.5 inch.

11. The insulating material of claim 6 wherein the minimum cross section of said solid insulative bodies is 0.01 inch.

12. The insulating material of claim 6 wherein the apparent viscosity as measured by an object moving in said insulating material is less than 20 times the viscosity of said insulating fluid.

13. An insulating material consisting of 10% to 80% by volume of an insulating fluid and 20% to 90% by volume of solid insulative bodies, the apparent voscosity of the insulating material to an object moving therein being less than 20 times the viscosity of said insulating fluid.

14. The insulating material of claim 13 wherein the relative densities of said insulating fluid and said solid insulative bodies are in the range of 0.7 to 1.0 of each other.

15. The insulating material of claim 13 wherein said solid insulative bodies are generally rounded.

16. The insulating material of claim 14 wherein said solid insulative bodies have a maximum cross section in the range of 0.01 to 0.5 inch.

17. The insulating material of claim 13 wherein the maximum viscosity of said insulating fluid is 10,000 centistokes.

18. The insulating material of claim 13 wherein said solid insulative bodies constitute 50-75% by volume, are generally rounded, and have a maximum cross section in the range of 0.05 to 0.5 inch.

* * * * *

UNITED STATES PATENT AND TRADEMARK OFFICE
CERTIFICATE OF CORRECTION

PATENT NO. : 4,690,780
DATED : Sep. 1, 1987
INVENTOR(S) : L. V. Chabala et al

It is certified that error appears in the above-identified patent and that said Letters Patent is hereby corrected as shown below:

Col. 2, line 39, "application." should be -- applications. --.

Col. 4, line 30, "is" should be -- in --.

Col. 6, line 14, "rob." should be -- rod. --.

Col. 8, lines 49 and 50, "voscosity" should be -- viscosity --.

Col. 8, line 59, "claim 14" should be -- claim 15 --.

Signed and Sealed this

Second Day of February, 1988

Attest:

DONALD J. QUIGG

Attesting Officer

Commissioner of Patents and Trademarks